United States Patent [19]

Hoffmann et al.

[11] Patent Number: 5,276,104
[45] Date of Patent: Jan. 4, 1994

[54] COPOLYMERS CONTAINING CARBOXYL GROUPS AND, IF APPROPRIATE, TERTIARY AMINO GROUPS, A PROCESS FOR THEIR PREPARATION AND THEIR USE IN COATING MATERIALS

[75] Inventors: Peter Hoffmann, Münster; Werner A. Jung, Ascheberg, both of Fed. Rep. of Germany

[73] Assignee: BASF Lacke+ Farben Aktiengesellschaft[DE/DE, Munster, Fed. Rep. of Germany

[21] Appl. No.: 778,118

[22] PCT Filed: Jun. 2, 1990

[86] PCT No.: PCT/EP90/00878
§ 371 Date: Dec. 5, 1991
§ 102(e) Date: Dec. 5, 1991

[87] PCT Pub. No.: WO90/15086
PCT Pub. Date: Dec. 13, 1990

[30] Foreign Application Priority Data

Jun. 8, 1989 [DE] Fed. Rep. of Germany ....... 3918669

[51] Int. Cl.$^5$ .......................................... C08F 220/40
[52] U.S. Cl. ................. 525/329.5; 525/328.2; 525/329.7; 525/329.9; 525/330.5; 525/386; 525/330.3; 526/318.42; 526/86; 526/87
[58] Field of Search ............... 525/328.2, 329.5, 329.7, 525/329.9, 330.3, 330.5, 386; 526/318.42, 86, 87

[56] References Cited

U.S. PATENT DOCUMENTS

| | | | |
|---|---|---|---|
| 3,669,942 | 6/1972 | Van Westrenen et al. | 526/309 |
| 3,956,245 | 5/1976 | Van Steenis et al. | 525/263 |
| 4,062,908 | 12/1977 | Van Acker et al. | 525/285 |
| 4,195,004 | 3/1980 | van Acker et al. | |

*Primary Examiner*—Bernard Lipman
*Assistant Examiner*—Mark Nagimo
*Attorney, Agent, or Firm*—Frank C. Werner; Paul L. Marshall

[57] ABSTRACT

The invention relates to copolymers containing carboxyl groups and having an acid number of 20 to 150 mg of KOH/g and a number average molecular weight of 2000 to 8000, which can preferably be prepared from copolymers containing hydroxyl groups by reaction with carboxylic anhydrides, to a process for their preparation and their use in coating agents. The copolymers contain a vinyl ester, a vinyl aromatic, a hydroxyalkyl ester of an $\alpha,\beta$-unsaturated carboxylic acid, and optionally other monomers that may contain acid groups. The vinyl ester is taken initially and the other monomers are metered during the course of a monomer addition time of equal length for all monomers, in the following manner:

1) the amount of the hydroxyalkyl ester added per time unit remains constant, and
2) the amount of the vinyl aromatic added within the first third of the monomer addition time is 15 to 30% by weight, that added within the second third is 25 to 40% by weight, and that added within the last third is 35 to 60% by weight, in each case relative to the total amount of vinyl aromatic.

12 Claims, No Drawings

COPOLYMERS CONTAINING CARBOXYL GROUPS AND, IF APPROPRIATE, TERTIARY AMINO GROUPS, A PROCESS FOR THEIR PREPARATION AND THEIR USE IN COATING MATERIALS

The invention relates to copolymers containing carboxyl groups and, if appropriate, tertiary amino groups, and soluble in organic solvents, a process for their preparation and their use in coating materials.

Copolymers containing carboxyl groups and, if appropriate, tertiary amino groups and their use in coating materials are known (cf, for example, EP-A 103,199, EP-B 51,275, EP-A 123,793, German Offenlegungsschrift 2,635,177, Japanese preliminary published specification 76,338/77 and WO 87/02041).

It is also known that problems arise in the preparation of acrylate copolymers if monomers having a reactivity differing greatly in comparison with acrylate monomers, such as, for example, vinyl esters of aliphatic monocarboxylic acids which have 5 to 15 C atoms and are branched in the α-position, are employed In these cases it is difficult to obtain unitary copolymers, i.e. copolymers having a homogeneous statistical distribution.

One possible means of solving this problem is the process described in U.S. Pat. No. 4,039,734 for the copolymerization of monomers of differing reactivity, in which at least a fraction of the reactive monomer is added continuously to the reaction mixture in an amount such that the relative ratio of monomers remains constant. The amount of monomer required for this in each case is determined by means of the heat of reaction liberated.

In the process described in German patent specification 2,032,647 unitary vinyl ester, vinyl-aromatic and hydroxyacrylate copolymers are obtained correspondingly by stepwise addition of the individual monomers In this process the total amount of vinyl ester is initially taken together with 5 to 15 % by weight of the total amount of the vinyl-aromatic and of the total amount of the other hydroxy-functional monomers and unsaturated carboxylic acids. The remaining amount of monomer is then either added gradually as a whole or is metered in at such a rate that the inflow of the OH-monomers and COOH-monomers takes a longer time than the inflow of the vinyl-aromatic. Disadvantages in this process are the very high residual monomer content (i.e. the amount of unreacted starting monomer, expressed in by weight, relative to the total amount of this monomer employed initially) of up to 40 % by weight of vinyl ester if a high proportion of vinyl-aromatic of up to 50 % by weight is used, and the toxicity problems associated therewith. Another unfavorable factor in respect of pollution of the environment with solvent when the paint films are dried is the high solvent content of the coating agents, caused by the high viscosity of the binder solutions. In addition there is a risk of cloudiness phenomena in the case of polymer solutions of a fairly high solids content; these phenomena can only be removed by adding further solvent.

The Shell technical information leaflet in the English language "VeoVa polymers LR-40 and LR-2041 for water-thinnable paints" also describes copolymers of this type containing vinyl esters, vinyl-aromatics and hydroxyalkyl esters, but these also exhibit the disadvantages just mentioned above.

Finally, some mass polymerization processes for the preparation of copolymers containing vinyl esters are also known in which, similarly, the total amount of the vinyl ester, if appropriate together with part of the total amount of the other monomers, and, if appropriate, initiator, is heated and then the remaining amount of monomers and initiator is added gradually (cf, for example, German patent specification 2,422,043 and German Offenlegungsschrift 2,615,101). Although it is possible in these processes to incorporate the vinyl ester completely (residual monomer content <10 % by weight), the copolymer solutions thus obtained are cloudy after the polymer material has incipiently dissolved and are not suitable for paint formulations.

Furthermore, copolymers containing hydroxyl groups are known from patent application DE 3,823,005, not yet published, which can be prepared by solution polymerization of vinyl esters, vinyl-aromatics, hydroxyalkyl esters of α,β-unsaturated acids and, if appropriate, further unsaturated monomers and which have a low content of residual monomer and result in clear copolymer solutions.

Finally, copolymers containing amino groups are known from paten application DE 3,827,587, also not yet published, which can be prepared by solution polymerization of vinyl esters, vinyl-aromatics, alkyl esters of α,β-unsaturated acids and, if appropriate, further unsaturated monomers, followed by aminolysis, and which also have a low content of residual monomer and give clear solutions of low viscosity.

The invention was thus bases on the object of providing copolymers containing carboxyl groups and, if appropriate, tertiary amino groups, which can be prepared using low-cost and readily available raw materials, have a low content of residual monomer (<10% by weight) of vinyl ester monomers and give clear solutions. In particular, the resulting solutions of copolymers containing carboxyl groups should have as low a viscosity as possible. The coating agents prepared using these copolymers should correspondingly have as high a solids content as possible at a viscosity advantageous for application of 16 to 20 seconds, measured in the DIN 4 flow cup at 23° C., and should result in coatings having good technological properties, in particular good hardness and resistance to gasoline.

Surprisingly, this object is achieved by means of copolymers containing carboxyl groups and having an acid number of 20 to 150 mg of KOH/g, preferably 0 to 90 mg of KOH/g, and a number average molecular weight of 2000 to 8000, which can be prepared by A) preparing, by means of free-radical solution polymerization at temperatures from 130° to 200° C., preferably 150° to 180° C. from $a_1$) 5 to 25 % by weight, preferably 10 to 19 % by weight of one or more vinyl esters of aliphatic monocarboxylic acids which are branched in the α-position and have 5 to 15 C atoms per molecule, $a_2$) 10 to 50 % by weight, preferably 20 to 45% by weight, of one or more vinyl-aromatic hydrocarbons, $a_3$) 5 to 40% by weight, preferably 15 to 35% by weight, of one or more hydroxyalkyl esters of α, β-unsaturated carboxylic acids, and $a_4$) 0 to 40% by weight of ethylenically unsaturated monomers containing carboxyl groups and/or other ethylenically unsaturated, copolymerizable monomers, the sum of the contents by weight of the components $a_1$ to $a_4$ being 100% by weight in each case, a copolymer containing hydroxyl groups and, if appropriate, carboxyl groups, by 1) initially taking at least 60% by weight, preferably 100% by weight, of the total amount of the component $a_1$, 2) metering in the components $a_2$ to $a_4$ and any remainder of the component $a_1$ which may be present within a monomer addition time of equal length for all the components at such a rate that i) the amount of the component $a_1$ added per time unit remains constant or decreases within the monomer addition time, ii) the amount of the components $a_3$ and $a_4$ added per time unit remains constant within the monomer addition time and iii) the amount of the component $a_2$ added within the first third of the monomer addition time is 15 to 30% by weight, preferably 18 to 26% by weight, of the total amount of the component $a_2$, the amount added within the second third is 25-40% by weight, preferably 30 to 38% by weight, of the total amount of the component $a_2$ and the amount added within the last third is 35-60% by weight, preferably 40 to 50% by weight, of the total amount of the component $a_2$, the sum of the amounts added in the 1st, 2nd and 3rd third being 100% by weight in each case, B) and, if appropriate reacting the copolymer obtained in stage A with carboxylic anhydrides, the amount of carboxylic anhydrides employed being so chosen that the resulting copolymer has an acid number of 20 to 150 mg of KOH/g, preferably 30 to 90 mg of KOH/g.

It is surprising and could not have been foreseen that the copolymers according to the invention containing carboxyl groups would have a low residual monomer content of vinyl ester monomer of <10% by weight, relative to the total amount of vinyl ester monomer employed initially, and would give clear solutions of a low viscosity at the highest possible solids content It is thus possible, using these copolymers, to prepare coating agents in which the solvent content is as low as possible, so that the solvent pollution of the environment when the paint films are dried is reduced compared with conventional paints based on binders/epoxy curing agents containing carboxyl groups. Finally, the coating agents prepared using these copolymers are distinguished by good technological properties in the resulting coating, in particular good hardness and resistance to gasoline.

The preparation of the copolymer containing hydroxyl groups and, if appropriate, carboxyl groups and the components $a_1$ to $a_4$ employed for this purpose will now be first described in greater detail below.

Vinyl esters of monocarboxylic acids, preferably vinyl esters of monocarboxylic acids having 5 to 15 C atoms per molecule and branched in the $\alpha$-position are employed as the component $a_1$. The branched monocarboxylic acids can be obtained by reacting formic acid or carbon monoxide and water with olefins in the presence of a liquid, strongly acid catalyst; the olefins can be products from the cracking of paraffinic hydrocarbons, such as mineral oil fractions, and can contain both branched and linear acyclic and/or cycloaliphatic olefins. When such olefins are reacted with formic acid or with carbon monoxide and water, a mixture of carboxylic acids is formed in which the carboxyl group is predominantly located on a quaternary carbon atom. Examples of other olefinic starting materials are propylene trimer, propylene tetramer and diisobutylene. The vinyl esters can also be prepared from the acids in a manner known per se, for example by reacting the acids with acetylene.

Owing to their easy accessibility, vinyl esters of saturated aliphatic monocarboxylic acids which have 9-11 C atoms and are branched at the $\alpha$-C atom are particularly preferred. The vinyl ester of p-tertiary-butyl-benzoic acid is also particularly preferred. Examples of other suitable vinyl esters are vinyl acetate and vinyl propionate.

The amount of the components $a_1$ is 5 to 25% by weight, preferably 10 to 19% by weight.

The component $a_2$ is a monovinyl-aromatic compound. It preferably contains 8 to 9 carbon atoms per molecule. Examples of suitable compounds are styrene, vinyl toluenes, $\alpha$-methylstyrene, chlorostyrenes, o-, m- or p-methylstyrene, 2,5-dimethylstyrene, p-methoxystyrene, p-tert.-butylstyrene, p-dimethylaminostyrene, p-acetamidostyrene and m-vinylphenol. It is preferable to employ vinyltoluenes and, in particular, styrene. The amount of component $a_2$ is 10 to 50% by weight, preferably 20 to 45% by weight.

Hydroxyalkyl esters of $\alpha,\beta$-unsaturated carboxylic acids having primary or secondary hydroxyl groups are suitable for use as the component $a_3$. Hydroxyalkyl esters having primary hydroxyl groups are mainly employed, since they have a higher reactivity in the polymer-analogous reaction with the carboxylic anhydride. It is, of course, also possible to use mixtures of hydroxyalkyl esters having primary hydroxyl groups and hydroxyalkyl esters having secondary hydroxyl groups, for example if hydroxyl groups are required in the copolymer containing carboxyl groups, for example for adjusting the compatibility of the copolymer containing carboxyl groups. Examples of suitable hydroxyalkyl esters of $\alpha,\beta$-unsaturated carboxylic acids having primary hydroxyl groups are hydroxyethylacrylate, hydroxypropylacrylate, hydroxybutylacrylate, hydroxyamylacrylate, hydroxyhexylacrylate, hydroxyoctylacrylate and the corresponding methacrylates. 2-Hydroxypropylacrylate, 2-hydroxybutylacrylate, 3-hydroxybutylacrylate and the corresponding methacrylates may be mentioned as examples of hydroxyalkyl esters having one secondary hydroxyl group which can be used.

The corresponding esters of other $\beta,\beta$-unsaturated carboxylic acids, such as, for example, crotonic acid and isocrotonic acid, can, of course, also be employed in each case.

The component $a_3$ can, at least in part, advantageously be a reaction product from one mole of hydroxyethylacrylate and/or hydroxyethylmethacrylate and, on average, two moles of $\epsilon$-caprolactone.

At least in part, a reaction product of acrylic acid and/or methacrylic acid with the glycidyl ester of a carboxylic acid having one tertiary $\alpha$-carbon atom can also be employed as the component $a_3$. Glycidyl esters of highly branched monocarboxylic acids are available under the tradename "Cardura". The reaction of acrylic acid or methacrylic acid with the glycidyl ester of a carboxylic acid having one tertiary $\alpha$-carbon atom can be carried out before, during or after the polymerization reaction.

The component $a_3$ is employed in an amount of 5 to 40% by weight, preferably 15 to 35% by weight.

In addition, 0 to 40% by weight of monomers containing carboxyl groups and/or other ethylenically unsaturated, copolymerizable monomers can be employed for the synthesis of the copolymer containing hydroxyl groups and, if appropriate, carboxyl groups.

Examples of suitable monomers containing carboxyl groups are unsaturated carboxylic acids, such as, for example, acrylic, methacrylic, itaconic, crotonic, isocrotonic, aconitic, maleic and fumaric acid, half-esters of maleic and fumaric acid and also β-carboxyethylacrylate and adducts of hydroxyalkyl esters of acrylic acid and/or methacrylic acid with carboxylic anhydrides, such as, for example, mono-2-methacryloyloxyethyl phthalate.

The choice of the other ethylenically unsaturated monomers is not particularly critical. Care should, however, be taken that the incorporation of these monomers does not result in undesirable properties in the copolymer. Thus the choice of the component $a_4$ depends largely on the desired properties of the curable composition in respect of elasticity, hardness, compatibility and polarity.

It is preferable to employ alkyl esters of olefinically unsaturated carboxylic acids as the component $a_4$. Examples of these are methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate and the corresponding esters of maleic, fumaric, tetrahydrophthalic, crotonic, isocrotonic, vinylacetic and itaconic acid.

Other ethylenically unsaturated compounds, such as, for example, alkoxyethylacrylates, aryloxyethylacrylates and the corresponding methacrylates, such as, for example, butoxyethyl (meth)acrylate or phenoxyethyl (meth)acrylate; unsaturated compounds having tertiary amino groups, such as, for example, N,N'-diethylaminoethyl methacrylate, 2-vinylpyridine, 4-vinylpyridine, vinylpyrroline, vinylquinoline, vinylisoquinoline, N,N'-dimethylaminoethyl vinyl ether and 2-methyl-5-vinylpyridine; compounds such as, for example, acrylonitrile, methacrylonitrile, acrolein and methacrolein are also suitable for use as the component $a_4$.

The polymerization of the monomer components $a_1$ to $a_4$ is preferably carried out with the exclusion of oxygen, for example by working in an atmosphere of nitrogen. The reactor is equipped with appropriate stirring, heating and cooling devices and also with a reflux condenser in which volatile constituents, such as, for example, styrene, are retained.

The polymerization reaction is carried out at temperatures from 130° to 200° C., preferably 150° to 180° C., using polymerization initiators and, if appropriate, polymerization regulators.

Suitable free-radical initiators are organic peroxides, such as, for example, dibenzoyl peroxide, dicumyl peroxide, cumene hydroperoxide, di-tert.-butyl peroxide, tert.-butylamyl peroxide, tert.-butyl hydroperoxide, 2,2-di-tert.-butylperoxybutane, tert.-amyl perbenzoate, 1,3-bis-(tert.-butylperoxyisopropyl)-benzene, diisopropylbenzene monohydroperoxide and diacylperoxides, such as, for example, diacetyl peroxide, a peroxyketal, such as, for example, 2,2-di-(tert.-amylperoxy)-propane and ethyl 3,3-di-(tert.-amylperoxy)-butyrate, thermolabile, highly substituted ethane derivatives, for example those based on silyl-substituted ethane derivatives and based on benzopinacol. It is also possible to employ aliphatic azo compounds, such as, for example, azobiscyclohexanenitrile. The amount of initiator is in most cases 0.1 to 5% by weight, relative to the amount of monomer to be processed, but it can, if appropriate, also be higher. The initiator, dissolved in part of the solvent employed for the polymerization, is metered in gradually during the polymerization reaction. The inflow of initiator preferably lasts about 1 to 2 hours longer than the inflow of monomer, in ordr to achieve a good action during the after-polymerization phase as well. If initiators having only a low rate of decomposition, i.e. a long half-life time, are employed under the present reaction conditions, it is also possible to charge the initiator first.

The reaction is preferably carried out in the presence of polymerization regulators since this makes it possible to avoid cloudiness in the polymer solutions more easily. Suitable regulators are preferably mercapto compounds, it being particularly preferable to employ mercaptoethanol. Examples of other possible regulators are alkyl mercaptans, such as, for example, t-dodecylmercaptan, octylmercaptan, phenylmercaptan, octyldecylmercaptan and butylmercaptan, and thiocarboxylic acids, such as thioacetic acid or thiolactic acid.

These regulators are employed in an amount of up to 2% by weight, relative to the amount of monomer to be processed. They are preferably dissolved in one of the monomer inflows and are added with the monomers. The regulator is preferably added at a constant rate.

The polymerization is carried out in a high-boiling, organic solvent which is inert towards the monomers employed and towards carboxylic anhydrides. Examples of suitable solvents are glycol ethers, such as, for example, diglycol dimethyl ether; aromatic compounds of fairly high substitution, such as, for example, Solvent Naphtha ®, heavy benzol, various types of Solvesso ®, various types of Shellsol ® and Deasol and also higher-boiling aliphatic and cycloaliphatic hydrocarbons, such as, for example, various grades of white spirit, mineral turpentine oil, tetralin and decalin.

It is fundamental to the invention that the copolymerization of the components $a_1$ to $a_4$ should be carried out as follows:

First at least 60% by weight, preferably 100% by weight, of the total amount of the component a to be employed is initially placed in the reactor together with part of the total amount of solvent to be employed, and is heated to the particular reaction temperature. The remaining amount of the solvent is—as already described—preferably added gradually together with the catalyst. The remaining amount which may still be present of the component $a_1$ and also the other monomers (components $a_2$, $a_3$ and $a_4$) are metered in to the component $a_1$ initially taken within a monomer addition time of equal length for all the components (in general 2–10 hours, as is customary for acrylate copolymerizations) in the following manner:

i) the amount added per time unit of the component $a_1$ which may still be present (i.e. the remaining amount of the component $a_1$ which was not initially taken) remains constant or decreases within the monomer addition time, the latter process variant being preferred. In the event of a constant rate of addition, it is preferable to meter in the component $a_1$ together with the components $a_3$ and $a_4$.

ii) The amount added per time unit of the components $a_3$ and $a_4$ remains constant within the monomer addition time.

iii) The amount added per time unit of the component $a_2$ is varied within the monomer addition time in such a way that the total amount of the component $a_2$ added within the first third of the monomer addition time is 15 to 30% by weight, preferably 18 to 26% by weight, of the total amount of the component $a_2$. Altogether 25 to 40% by weight, preferably 30 to 38% by weight, of the total amount of the component $a_2$ are metered in within the second third of the monomer addition time and 35 to 60% by weight, preferably 40 to 50% by weight, of the total amount of the component $a_2$ are metered in within the last third of the monomer addition time, the sum of the amounts added in the 1st, 2nd and 3rd third being of course 100% by weight.

There are various possible means of varying the amount of the component $a_2$ added per time unit, the only decisive factor being that the total amounts indicated above, added in each third, are maintained. Thus, for example, a stepwise change in the amount of the component $a_2$ added per time unit is possible. The number of steps in which the amount added is changed in each case can be chosen as desired. Thus, for example, the amount of the component $a_2$ added per time unit can be increased only at the start of the second third and/or at the start of the third third. The amount added per time unit within the third then remains constant in each case. However, it is also possible to vary the amount of the component $a_2$ added per time unit continuously, corresponding to the limiting case of an infinite number of steps.

It is assumed that the addition of the components in the manner mentioned promotes copolymerization and reduces homopolymerization of the individual components. In addition, copolymers having a very low content of residual monomer and giving clear solutions with a high solids content are obtained.

The copolymers, if appropriate containing carboxyl groups, thus obtained preferably have an average molecular weight of 1500 to 8000(number average) and an OH number of 30 to 200 mg of KOH/g, preferably 70 to 150 mg of KOH/g. The copolymers containing hydroxyl groups, and if appropriate carboxyl groups, thus obtained are then reacted with carboxylic anhydrides in a second stage to give the corresponding copolymers containing carboxyl groups. The amount of carboxylic anhydride employed is so chosen that the resulting copolymer has an acid number of 20 to 150 mg of KOH/g, preferably 30 to 90 mg of KOH/g, and an OH number of 0 to 60 mg of KOH/g. The number average molecular weight of the copolymer B containing carboxyl groups is 2000 to 8000.

As well as this preferred variant of introducing at least some of the carboxyl groups of the copolymer by the addition of carboxylic anhydrides onto copolymers containing hydroxyl groups (obtained in step A), it is, of course, also possible to incorporate the carboxyl groups into the copolymer directly in the polymerization by using appropriate amounts of monomers containing carboxyl groups as the component $a_4$.

Carboxylic anhydrides suitable for the addition onto the copolymers containing hydroxyl groups are the anhydrides of aliphatic, cycloaliphatic and aromatic, saturated and/or unsaturated dicarboxylic and polycarboxylic acids, such as, for example, the anhydrides of phthalic acid, tetrahydrophthalic acid, hexahydrophthalic acid, succinic acid, maleic acid, itaconic acid, glutaric acid, trimellitic acid and pyromellitic acid and also halogenated or alkylated derivatives thereof.

It is preferable to employ anhydrides of phthalic acid, tetrahydrophthalic acid and hexahydrophthalic acid and also 5-methylhexahydrophthalic anhydride.

The reaction of the copolymers containing hydroxyl groups with the carboxylic anhydrides is carried out at temperatures from 100° to 140° C. in the presence of a catalyst, such as, for example, tertiary amines.

If, on the other hand, the copolymers containing hydroxyl groups contain tertiary amino groups, for example through the use of monomers having tertiary amino groups or through prior reaction of the copolymers containing hydroxyl groups with compounds C containing per molecule an average of 0.8 to 1.5, preferably 1, free isocyanate groups and at least 1 tertiary amino group—it is possible to dispense with a catalyst and to carry out the reaction at lower temperatures from 50° to 130° C.

It is particularly advantageous if tertiary amino groups are incorporated into the copolymer containing carboxyl groups, since they catalyze a subsequent cross-linking of the polymer containing carboxyl groups by means of epoxide groups, and the baking temperatures of coating agents based on these polymers are thus reduced.

If the copolymer contains tertiary amino groups, care must be taken in the addition of unsaturated carboxylic anhydrides, such as for example in the addition of maleic anhydride, that no solvents are employed which react with the unsaturated carboxylic anhydride as the result of catalysis by the tertiary nitrogen groups. Examples of solvents which cannot be used are therefore acetone, methyl ethyl ketone, butyl acetate and other acetylating solvents. Hydrocarbons and polar solvents, such as dimethylformamide, dimethylacetamide and N-methylpyrrolidone etc., can be used.

The tertiary amino groups are preferably introduced by reacting the polymer B containing hydroxyl and carboxyl groups with compounds C containing per molecule an average of 0.8 to 1.5, preferably 1, free isocyanate groups and at least 1 tertiary amino group. However, it is also possible first to react the copolymer containing hydroxyl groups with the compounds C and only then to introduce the carboxyl groups into the copolymer by reaction with a carboxylic anhydride. In this case—as already stated—the reaction with the anhydride can be carried out at lower temperatures.

The amount of the compound C is so chosen that the resulting resin has an amine number of 0 to 50 mg of KOH/g. If the copolymers are to be employed in coating agents which are cured at room temperature, the amine number is adjusted to a higher figure, 10 to 40 mg of KOH/g.

The compounds C used for the introduction of the tertiary amino group are prepared by reacting diisocyanates or polyisocyanates with an amount of a tertiary amine which is less than the stoichiometric equivalent. Tertiary amines which are suitable for this reaction are those of the general formula $NR_1R_2R_3$ in which $R_1$ preferably denotes an alkanol radical or another radical containing hydroxyl groups and $R_2$ and $R_3$ can represent alkyl or cycloalkyl radicals. Dialkylalkanolamines, such as, for example, dimethylethanolamine, diethylethanolamine and higher homologs or isomers thereof are preferred.

The following are examples of suitable diisocyanates or polyisocyanates: aromatic isocyanates, such as, for example, 2,4-toluylene diisocyanate and 2,6-toluylene diisocyanate and mixtures thereof, 4,4'-diphenylmethane diisocyanate, m-phenylene, p-phenylene, 4,4'-biphenyl, 1,5-naphthalene, 1,4-naphthalene, 4,4'-toluylene and xylylenediisocyanate and also substituted aromatic systems, such as, for example, dianisidine diisocyanates, 4,4'-diphenyl ether diisocyanates or chlorodiphenylene diisocyanates and aromatic isocyanates of higher functionality, such as, for example, 1,3,5-triisocyanatobenzene, 4,4',4'''-triisocyanatotriphenylmethane, 2,4,6-triisocyanatotoluene and 4,4'-diphenyldimethylmethane-2,2',5,5'-tetraisocyanate; cycloaliphatic isocyanates, such as, for example, 1,3-cyclopentane diisocyanate, 1,4-cyclohexane diisocyanate, 1,2-cyclohexane diisocyanate and isophorone diisocyanate; and aliphatic isocyanates, such as, for example, trimethylene, tetramethylene, pentamethylene, hexamethylene, trimethylhexamethylene 1,6-diisocyanate and tris-hexamethylene triisocyanate.

It is preferable to employ diisocyanates having isocyanate groups of differing reactivity, such as, for example, isophorone diisocyanate.

The reaction between the amine and the isocyanate is carried out at temperatures from 0° to 80° C., preferably 20° to 50° C. The ratios of the reactants are so chosen that the resulting compound C contains 0.8 to 1.5, preferably 1, free isocyanate groups.

The present invention also relates to a process for the preparation of copolymers containing carboxyl groups and having an acid number of 20 to 150 mg of KOH/g, preferably 30 to 90 mg of KOH/g, and a number average molecular weight of 2000 to 8000, which comprises reacting $a_1$) 5 to 25% by weight, preferably 10 to 20% by weight, of one or more vinyl esters of monocarboxylic acids, preferably vinyl esters of monocarboxylic acids which are branched in the α-position and have 5 to 15 C atoms per molecule, $a_2$) 10 to 50% by weight, preferably 20 to 45% by weight, of one or more vinyl-aromatic hydrocarbons, $a_3$) 5 to 40% by weight, preferably 15 to 35% by weight, of one or more hydroxyalkyl esters of α,β-unsaturated carboxylic acids, and $a_4$) 0 to 40% by weight of ethylenically unsaturated monomers containing carboxyl groups and/or of other ethylenically unsaturated, copolymerizable monomers, at temperatures from 130° to 200° C., preferably 150° to 180° C., to give a copolymer containing hydroxyl groups and, if appropriate, carboxyl groups, in which reaction I. at least 60% by weight, preferably 100% by weight, of the total amount of the component $a_1$ is initially taken, and II. the components $a_2$ to $a_4$ and any remainder of the component $a_1$ which may be present are metered in within a monomer addition time of equal length for all the components at such a rate that 1) the amount of the component $a_1$ added per time unit remains constant or decreases within the monomer addition time, 2) the amount of the components $a_3$ and $a_4$ added per time unit remains constant within the monomer addition time and 3) the amount of the component $a_2$ added within the first third of the monomer addition time is 15 to 30% by weight, preferably 18 to 26% by weight, of the total amount of the component $a_2$, the amount added within the second third of the monomer addition time is 25 to 40% by weight, preferably 30 to 38% by weight, of the total amount of the component $a_2$ and the amount added within the last third of the monomer addition time is 35 to 60% by weight, preferably 40 to 50% by weight, of the total amount of the component $a_2$, the sum of the amounts added in the 1st, 2nd and 3rd third being 100% by weight in each case, and B) if appropriate the copolymer obtained in step A is reacted with carboxylic anhydrides, the amount of carboxylic anhydrides employed being so chosen that the resulting copolymer has an acid number of 20 to 150 mg of KOH/g, preferably 30 to 90 mg of KOH/g.

The components $a_1$ to $a_4$ which can be employed in this process and the manner of carrying out the process according to the invention have already been described in detail in connection with the copolymers, according to the invention, containing carboxyl groups, so that here reference will only be made to pages 7 to 18 of the present description.

The present invention also relates to coating agents containing, as a binder component, the copolymers according to the invention containing carboxyl groups and, if appropriate, tertiary amino groups. The curing components employed are compounds containing at least two epoxide groups per molecule. The ratio of copolymer containing carboxyl groups to epoxide compound in these coating agents is so chosen that the ratio of the acid groups in the copolymer to the epoxide groups in the epoxide curing agent is within the range from 0.3:1 to 3:1. If appropriate, a crosslinking catalyst is used.

Examples of compounds having at least two epoxide groups per molecule are condensation products formed from epichlorohydrin and bisphenol A, cycloaliphatic bisepoxides corresponding to the formulae (I) and (II):

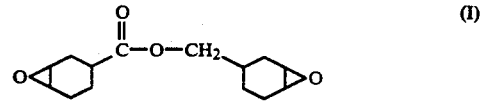

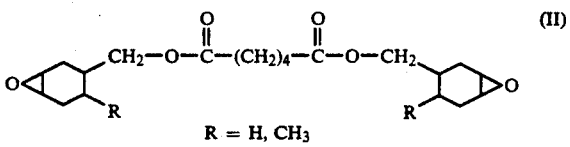

R = H, CH₃ and epoxidized polybutadienes resulting from reacting commercially available polybutadiene oils with peracids or organic acid/$H_2O_2$ mixtures, novolaks containing epoxide groups, glycidyl ethers of a polyhydric alcohol, for example ethylene glycol diglycidyl ether, glycerol polyglycidyl ether, sorbitol polyglycidyl ether, trimethylolpropane polyglycidyl ether and pentaerythritol polyglycidyl ether, and low-molecular acrylate resins having oxirane groups in a lateral position.

If appropriate, a crosslinking catalyst can be used. Catalysts which are particularly suitable in this respect are tertiary amines, quaternary ammonium compounds, such as, for example, benzyltrimethylammonium hydroxide and benzyltrimethylammonium chloride, special chromium compounds and tin compounds. The use of a crosslinking catalyst is, of course, superfluous in the majority of cases where tertiary amino groups have already been incorporated in the acrylate copolymer.

Lower baking temperatures and shorter baking times are obtained by using an internal or external crosslinking catalyst. The crosslinking catalyst is preferably used in an amount of 0.5 to 10% by weight, relative to the weight of the diepoxide or polyepoxide component.

The coating agents according to the invention can, in addition, also contain customary pigments and fillers in customary amounts, preferably 0 to 60% by weight, relative to the total composition, and also other customary auxiliaries and additives such as, for example, leveling agents, silicone oils, plasticizers, such as phosphoric acid esters and phthalic acid esters, additives which control the viscosity, matting agents, UV absorbers and light stabilizers, in customary amounts, preferably 0.2 to 10% by weight, relative to the whole composition.

These coating agents can be applied to a substrate in the form of a film by spraying, flow coating, dipping, rolling, doctor-blade coating or brushing, the film subsequently being cured to form a firmly adhering coating.

The coating agents according to the invention are suitable—if low curing temperatures between 20° and 80° C. (see above) can be used by a suitable choice of the curing component—for refinishing motor vehicles and also, in particular, for use as a priming coat and filler material.

The invention is illustrated in greater detail in the following examples. All data relating to parts and percentages are by weight, unless anything to the contrary is expressly stated.

EXAMPLE 1

425.75 parts of Shellsol A ® (mixture of aromatics substituted by C3 - C4-alkyl) and 400 parts of a commercially available mixture of vinyl esters of saturated aliphatic monocarboxylic acids having, in the main, 10 C atoms and branched at the α-C atom are initially placed in a 4 liter alloy steel kettle equipped with a stirrer, a reflux condenser and inflow devices, and are heated to 170° C.

The following are weighed out into monomer tank I and are mixed:
600.0 parts of hydroxyethyl methacrylate,
250.0 parts of n-butyl acrylate,
150.0 parts of N,N'-dimethylaminoethyl methacrylate,
200.0 parts of butyl methacrylate and
4.1 parts of triisodecylphosphite The following is weighed out into monomer tank II:
400.0 parts of styrene The following are weighed out into the initiator tank and are mixed:
22.0 parts of dicumyl peroxide and
66.0 parts of Shellsol A ®

The contents of monomer tank I are metered in at a uniform rate in the course of 4.5 hours. The contents of monomer tank II are metered in in the course of 4.5 hours at such a rate that 100 parts are metered in in the first 90 minutes of the total flow time, 140 parts are metered from the 91st to the 180th minute of the total flow time and 160 parts of styrene are metered within the remaining flow time. During the inflow the temperature in the kettle is kept at 165° to 170° C. When the inflows are complete,
5.0 parts of dicumyl peroxide and
15.0 parts of Shellsol A ®
are again metered in in the course of 1 hour from the initiator tank. Polymerization is then continued for a further 2 hours at this temperature. The mixture is then incipiently dissolved by means of 361 parts of xylene. The non-volatile content (1 hour at 130° C.) of the copolymer solution is 70% and the viscosity of this solution (50% in butyl acetate) is 3.25 dPas at 23° C.

The residual content of free vinyl ester monomer in the solution was found to be 0.9% by weight by gas chromatography. This corresponds to a residual monomer content of 6.4% by weight, relative to the total amount of vinyl ester monomer employed.

1325.0 parts of this acrylate resin solution are weighed out into a 4 liter alloy steel kettle equipped with a stirrer and a reflux condenser. After 221.4 parts of hexahydrophthalic anhydride have been added, the mixture is heated to 130° C. and is kept at this temperature until the acid numbers in an alcoholic medium and in an aqueous medium are the same and are 70-72 mg of KOH/g. The copolymer solution is incipiently dissolved with 221.25 parts of xylene to give a solids content of 65% and is diluted further with 321.5 parts of secondary butanol.

The non-volatile content (1 hour at 130° C.) of this copolymer solution 1 is 55% and the viscosity of the solution (50% in butyl acetate) is 24.5 dPas at 23° C. (ICI plate-cone viscosity). The copolymer has an acid number of 70 mg of KOH/g and an amine number of 24 mg/KOH/g.

30 parts of this copolymer solution 1 are mixed with 8.2 parts of a 60% strength solution (methoxypropanol/xylene) of an epoxidized acrylamidomelamine resin having an epoxide equivalent weight of approx. 300 (trade name "LSE 4109" made by Monsanto), and the mixture is diluted with 5 parts of methoxypropanol.

The clear lacquer A thus obtained is applied to glass panels at a wet film thickness of 200 μm and is then dried under the conditions indicated in Table 1. The resulting coatings were then tested by the methods shown in Table 1. The results of the tests are shown in Table 1.

A second clear lacquer B is prepared by mixing 30 parts of copolymer solution 1 with 6.2 parts of a commercially available epoxidized novolak (commercial product "D.E.N. 444" made by Dow Chemicals) having an epoxide equivalent weight of 210 and an average functionality of 3 to 4, and diluting the mixture with 7.5 parts of methoxypropanol. This clear lacquer B is applied to glass panels analogously to clear lacquer A and dried, and the resulting coating is examined analogously to clear lacquer A. The results of the tests are shown in Table 1.

EXAMPLE 2

419.75 parts of Shellsol A ® (mixture of aromatics substituted by C3 - C4-alkyl groups) and 300 parts of a commercially available mixture of vinyl esters of saturated aliphatic monocarboxylic acids having, in the main, 10 C atoms and being branched at the α-C atom are initially placed in a 4 liter alloy steel kettle equipped with a stirrer, a reflux condenser and inflow devices, and are heated to 170° C.

The following are weighed out into monomer tank I and are mixed:
700.0 parts of hydroxyethyl methacrylate,
200.0 parts of n-butyl acrylate,
200.0 parts of methyl methacrylate and
20.0 parts of mercaptoethanol The following is weighed out into monomer tank II:

600.0 parts of styrene

The following are weighed out into the initiator tank and are mixed:

26.0 parts of dicumyl peroxide and
78.0 parts of Shellsol A ®

The contents of monomer tank I are metered in at a uniform rate in the course of 4.5 hours. The contents of monomer tank II are metered in in the course of 4.5 hours at such a rate that 100 parts of styrene are metered in in the course of the first 90 minutes of the total flow time, 140 parts of styrene are metered in from the 91st to the 180th minute of the total flow time and 160 parts of styrene are metered in in the remaining inflow time. During the inflow the temperature in the kettle is kept at 165 to 170° C. When the inflows are complete 5.0 parts of dicumyl peroxide and
15.0 parts of Shellsol A ® are again metered in from the initiator tank in the course of 1 hour. Polymerization is then continued at this temperature for a further 2 hours. The mixture is then incipiently dissolved by means of 427.3 parts of xylene and 427.3 parts of 1-methoxyprop-2-yl acetate. The non-volatile content (1 hour at 130° C.) of this copolymer solution is 60% and the viscosity of the solution (50% in butyl acetate) is 10.80 dPas at 23° C. (ICI plate-cone viscosity).

The residual content of free vinyl ester monomer in the solution was found to be 0.8% by weight by means of gas chromatography. This corresponds to a residual monomer content of 8.9% by weight, relative to the total amount of vinyl ester monomer employed.

1560.0 parts of this acrylate resin solution are weighed out into a 4 liter alloy steel kettle equipped with a stirrer and a reflux condenser. After 222.7 parts of hexahydrophthalic anhydride have been added, the mixture is heated to 130° C. and is kept at this temperature until the acid numbers in an alcoholic medium and in an aqueous medium are the same and are 70 to 72 mg of KOH/g.

The mixture is then cooled to 60° C. and 296.6 parts of a 1:1 adduct formed from N,N'-dimethylethanolamine and isophorone diisocyanate and also 12.9 parts of dibutyltin dilaurate are added. The temperature is kept at 60° C. until free isocyanate is no longer detectable. The copolymer solution is diluted to a solids content of 50% with 462.3 parts of secondary butanol. The copolymer solution 2 thus obtained has an acid number of 63 mg of KOH/g, a viscosity of 8.5 dPas at 23° C. and an amine number of 24 mg of KOH/g.

30 parts of this copolymer solution 2 are mixed with 5.4 parts of a 60% strength solution in methoxypropanol/xylene of an epoxidized acrylamidomelamine resin having an epoxide equivalent weight of approx. 300 (trade name "LSE 4109" made by Monsanto).

The clear lacquer C thus obtained is applied to glass panels analogously to clear laquer A and is dried and the resulting coating is examined analogously to clear lacquer A. The results of the tests are shown in Table 1.

Another clear lacquer D is prepared by mixing 30 parts of the copolymer solution 2 with 4.2 parts of a commercially available epoxidized novolak (commercial product "D.E.N. 444" made by Dow Chemicals) having an epoxide equivalent weight of 210 and an average functionality of 3 to 4. This clear lacquer D is applied to glass panels analogously to clear lacquer A and is dried and the resulting coating is examined analogously to clear lacquer A. The results of the tests are shown in Table 1.

TABLE 1

| | Results of the tests | | | |
|---|---|---|---|---|
| | lacquer A | lacquer B | lacquer C | lacquer D |
| Pendulum hardness (König) after drying for 72 hours at RT[1] | 50 s | 71 s | — | 60 s |
| Gasoline test[2] after drying for 7 days at RT[1] | 0/0 | 0/0 | — | 0/0 |
| Pendulum hardness (König) after drying for 30 minutes at 60° C. and then being stored for 2 hours at RT[1] | 59 s | 67 s | 40 s | 51 s |
| Gasoline test[2] after drying for 30 minutes at 60° C. and then being stored for 7 days at RT[1] | 0.5/0 | 0/0 | 0/0 | 0/0 |
| Pendulum hardness (König) after drying for 30 minutes at 100° C. and then being stored for 2 hours at RT[1] | 95 s | 112 s | 101 s | 115 s |
| Gasoline test after being dried for 30 minutes at 100° C. and then being stored for | | | | |
| 4 hours at RT[1] | 1/1 | 0/0 | 1/1 | 0/0 |
| 7 days at RT[1] | 0/0 | 0/0 | 0/0 | 0/0 |

[1] Room Temperature
[2] Felt platelets (cross-section 5 cm) impregnated with commercially available premium grade gasoline are left, covered, on the film for 5 minutes. The marking of the film (0 = no marking; 3 = pronounced marking) and the softening of the film (0 = no softening; 3 = pronounced softening) are then assessed.

Examples 1 and 2 show that the resulting copolymer solutions 1 and 2 have only a very low residual monomer content of vinyl ester and also a low viscosity at a high solids content. It is thus possible, using these copolymer solutions, to prepare coating agents having a high solids content and hence a low pollution of the environment by solvents when the films are dried.

In addition, the clear lacquers A to D prepared in this manner result in coatings of good hardness and resistance to gasoline. In addition, by virtue of their low crosslinking temperatures, these coating agents are also very suitable for automobile refinishing.

We claim:

1. Copolymers containing carboxyl groups and having an acid number of 30 to 150 mg of KOH/g and a number average molecular weight of 2000 to 8000, prepared by a process comprising the steps of:
   A) preparing, by means of free-radical solution polymerization at temperatures from 130° C. to 200° C. using polymerization initiator(s), from
      $a_1$) 5 to 25% by weight of one or more vinyl esters of monocarboxylic acids;
      $a_2$) 10 to 50% by weight of one or more vinyl-aromatic hydrocarbons;
      $a_3$) 5 to 40% by weight of one or more hydroxyalkyl esters of $\alpha,\beta$-unsaturated carboxylic acids; and
      $a_4$) 0 to 40% by weight of ethylenically unsaturated monomers containing carboxyl groups and/or other ethylenically unsaturated, copolymerizable monomers, different from $a_1$-$a_3$;
   the sum of the contents by weight of the components $a_1$ to $a_4$ being 100% by weight in each case,
   said copolymers produced by:

1) initially introducing to a reaction vessel at least 60% by weight of the total amount of the component $a_1$;
2) in the presence of the polymerization initiator(s), metering in the components $a_2$ to $a_4$ and any remainder of the component $a_1$ which may be present within a monomer addition time of equal length for all the components at such a rate that
   i) the amount of the component $a_1$ added per time unit remains constant or decreases within the monomer addition time;
   ii) the amount of each of the components $a_3$ and $a_4$ added per time unit remains constant within the monomer addition time; and
   iii) the amount of the component $a_2$ added within the first third of the monomer addition time is 15 to 30% by weight of the total amount of the component $a_2$, the amount added within the second third is 25–40% by weight, of the total amount of the component $a_2$, and the amount added within the last third is 35–60% by weight of the total amount of the component $a_2$, the sum of the amounts added in the 1st, 2nd and 3rd being 100% by weight in each case; and
B) optionally reacting the copolymer obtained in stage A with carboxylic anhydrides, the amount of carboxylic anhydrides employed being so chosen that the resulting copolymer has an acid number of 30 to 150 mg of KOH/g.

2. A copolymer containing carboxyl groups as claimed in claim 1, wherein the copolymer has an acid number of 30 to 90 mg of KOH/g.

3. A copolymer containing carboxyl groups as claimed in claim 1, wherein the copolymer prepared in step A has an OH number of 30 to 200 mg of KOH/g and this copolymer is reacted with carboxylic anhydrides to give a copolymer B containing carboxyl groups.

4. A copolymer containing carboxyl groups as claimed in claim 3, wherein the copolymer prepared in step A has an OH number of 70 to 150 mg of KOH/g and which can be prepared by using 15 to 35% by weight of component $a_3$.

5. A copolymer containing carboxyl groups as claimed in claim 1, wherein the copolymer containing carboxyl groups has an OH number of 0 to 60 mg of KOH/g and an amine number of 0 to 50 mg of KOH/g.

6. A copolymer containing carboxyl groups as claimed in claim 1, wherein the copolymer is prepared by using 10 to 19% by weight of one or more vinyl esters of monocarboxylic acids.

7. A copolymer containing carboxyl groups as claimed in claim 1, wherein one or more vinyl esters of aliphatic monocarboxylic acids, said aliphatic monocarboxylic acids being branched in the α-position and having 5 to 15 C atoms per molecule, are employed as the component $a_1$.

8. A copolymer containing carboxyl groups as claimed in claim 1, wherein one or more vinyl esters of saturated aliphatic monocarboxylic acids, said aliphatic monocarboxylic acids having 9 to 11 C atoms and being branched at the α-C atom, are employed as the component $a_1$.

9. A copolymer containing carboxyl groups as claimed in claim 1, wherein the copolymer containing carboxyl groups has an amine number of 10 to 40 mg of KOH/g.

10. A process for the preparation of copolymers containing carboxyl groups as claimed in claim 1, which comprises the steps of:
   A) reacting the monomers $a_1$ to $a_4$ at temperatures from 130° to 200° C. in the presence of polymerization initiators to give a copolymer containing hydroxyl groups and optionally carboxyl groups, in which reaction
      I) at least 60% by weight of the total amount of the component $a_1$ is initially taken, and
      II) the components $a_2$ to $a_4$ and any remainder of the component $a1$ which may be present are metered in within a monomer addition time of equal length for all the components at such a rate that;
      1) the amount of the component $a_1$ added per time unit remains constant or decreases within the monomer addition time,
      2) the amount of each of the components $a_3$ and $a_4$ added per time unit remains constant within the monomer addition time, and
      3) the amount of the component $a_2$ added within the first third of the monomer addition time is 15 to 30% by weight of the total amount of the component $a_2$, the amount added within the second third of the monomer addition time is 25 to 40% by weight, of the total amount of the component $a_2$, and the amount added within the last third of the monomer addition time is 35 to 60% by weight of the total amount of the component $a_2$, the sum of the amounts added in the 1st, 2nd and 3rd being 100% by weight, and
   B) optionally reacting the copolymer obtained in step A with carboxylic anhydrides, the amount of carboxylic anhydrides employed being so chosen that the resulting copolymer has an acid number of 30 to 150 mg of KOH/g.

11. A process as claimed in claim 10, wherein 100% by weight of the total amount of the component $a_1$ is introduced to the reaction vessel in step (I).

12. A process as claimed in claim 10, wherein the monomers are reacted at temperatures from 150° to 180° C.

* * * * *